(12) United States Patent
Kropf et al.

(10) Patent No.: US 12,384,987 B2
(45) Date of Patent: Aug. 12, 2025

(54) PROCESS FOR PRODUCING METAL ORGANIC FRAMEWORKS

(71) Applicant: Henkel AG & Co. KGaA, Duesseldorf (DE)

(72) Inventors: Christian Kropf, Hilden (DE); Marc Weyhe, Krefeld (DE); Stefan Kaskel, Dresden (DE); Steffen Hausdorf, Ringenhain (DE); Philipp Mueller, Luebeck (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 980 days.

(21) Appl. No.: 17/351,648

(22) Filed: Jun. 18, 2021

(65) Prior Publication Data

US 2021/0309937 A1  Oct. 7, 2021

Related U.S. Application Data

(63) Continuation of application No. PCT/EP2019/085780, filed on Dec. 17, 2019.

(30) Foreign Application Priority Data

Dec. 18, 2018 (DE) .......................... 102018222193.6

(51) Int. Cl.
| | | |
|---|---|---|
| C11D 3/16 | (2006.01) | |
| C01B 37/00 | (2006.01) | |
| C07F 5/06 | (2006.01) | |
| C11D 3/00 | (2006.01) | |

(52) U.S. Cl.
CPC .............. *C11D 3/168* (2013.01); *C01B 37/00* (2013.01); *C07F 5/061* (2013.01); *C11D 3/0068* (2013.01); *C11D 2111/12* (2024.01)

(58) Field of Classification Search
CPC ............ B01D 2253/204; B01J 31/1691; B01J 20/226; B01J 31/069; B01J 31/123; C07C 51/418; C07F 7/28; C07F 3/06; C07F 1/08
See application file for complete search history.

(56) References Cited

U.S. PATENT DOCUMENTS

| | | | | |
|---|---|---|---|---|
| 2009/0263621 | A1* | 10/2009 | Chang ................ | B01J 20/28007 556/400 |
| 2012/0055880 | A1* | 3/2012 | Loiseau ................. | C07F 5/069 556/184 |
| 2012/0289399 | A1* | 11/2012 | Hwang ................. | B01J 20/226 96/108 |
| 2019/0022622 | A1* | 1/2019 | Park ....................... | B01J 20/226 |

FOREIGN PATENT DOCUMENTS

| | | | | |
|---|---|---|---|---|
| DE | 102015211920 A1 | 12/2016 | | |
| DE | 102017209840 A1 | 12/2018 | | |
| FR | 3026027 A1 * | 3/2016 | ............. | B01J 20/00 |
| WO | WO-2012156436 A1 * | 11/2012 | ............. | B01D 53/02 |

OTHER PUBLICATIONS

Z. Yin et al., 44 Dalton Transactions, 5258-5275 (2015) (Year: 2015).*
C. Volkringer et al., 21 Chemistry of Materials, 5695-5697 (2009) (Year: 2009).*
M. Qiu et al., 16 Crystal Growth & Design, 3639-3646 (2016) (Year: 2016).*
PCT International Search Report PCT/EP2019/085780 Mailing Date: Feb. 4, 2020; Completed: Feb. 14, 2020 3 pages.
Volkringer, Christophe et al., "Synthesis, Single-Crystal X-ray Microdiffraction, and NMR Characterizations of the Giant Pore Metal-Organic Framework Aluminum Trimesate MIL-100", Chemistry of Materials Communication, vol. 21 No. 24, Nov. 2009 (Nov. 19, 2009), American Chemical Society, pp. 5695-5697. DOI: 10.1021/cm901983a. <pubs.acs.org/cm>.
Loiseau, Thierry et al., "MIL-96, a Porous Aluminum Trimesate 3D Structure Constructed from a Hexagonal Network of 18-Membered Rings and μ3-Oxo-Centered Trinuclear Units", Journal of the American Chemical Society (JACS), Articles, vol. 128 No. 31, 2006, pp. 10223-10230. XP-002531103. DOI:10.1021/Ja0621086.

* cited by examiner

*Primary Examiner* — Alexander R Pagano
(74) *Attorney, Agent, or Firm* — Bojuan Deng

(57) ABSTRACT

The metal organic framework (MOF) MIL-100 (Al) can be produced in a process in which aluminum nitrate and trimesic acid are brought to react with one another in an alcohol/water mixture under the action of $NH_3$ and/or an $NH_3$-releasing compound under mild conditions.

9 Claims, 4 Drawing Sheets

PROCESS FOR PRODUCING METAL ORGANIC FRAMEWORKS

FIELD OF THE INVENTION

The present invention relates to a process for producing metal organic frameworks (MOFs).

BACKGROUND OF THE INVENTION

After washing, textiles quickly lose their fresh scent when they are worn, especially when the wearer does physical activity that leads to perspiration. The fresh smell is replaced by the smell of sweat, which is considered unpleasant by both the wearer and other people.

Overall, most body odors are considered unpleasant. Body odor refers to all smellable bodily exhalations from humans through the skin and also in a broader sense from other body orifices, such as bad breath, or odors caused by excrement (urine, feces, flatus). The smell of sweat is usually most clearly noticeable, although only the secretions of the apocrine sweat glands, which are mainly located in the armpits, smell. The bacterial decomposition of the substances contained in armpit sweat, including the body's own fats and proteins, creates odors that are considered unpleasant and often even repulsive.

Unsaturated or hydroxylated-branched fatty acids such as 3-methyl-2-hexanoic acid or 3-hydroxy-3-methylhexanoic acid, or sulfanyl alcohols such as 3-methyl-sulfanylhexan-1-ol, are mainly responsible for body odor, in particular for the odor of sweat. The body odor itself is influenced by various bacteria that make up the skin flora. These bacteria form what are known as lipases, which break down the fatty acids into smaller molecules, for example butanoic acid (butyric acid). Propanoic acid (propionic acid) is also a common component of sweat. It is produced when amino acids are broken down by what are known as propanoic acid bacteria.

In addition to body odor, other odors considered to be unpleasant by humans are also referred to as malodors in the present invention, such as those that come from leftover food, from contamination of the floor or other surfaces, from tobacco smoke or from rotting and decaying organisms.

Nowadays, perfume oils are often added to washing or cleaning agents. These ensure that malodors are masked or are perceptible to humans only after a certain period of time. Nowadays, however, allergic reactions to individual constituents of different formulations, including perfume oils, are increasing. There is therefore also a need for formulations having the lowest possible content of perfume oils. In addition, it is desirable not to mask malodors, but rather to absorb them at least in part and preferably completely and thus remove them from the textile or from the surface, for example from dishes or floors. It has been shown that MOFs (metal organic frameworks) are able to trap malodors and thus reduce their odor intensity or even completely avoid malodors.

Metal organic frameworks (MOFs) are scaffolds that consist of metal centers (atoms or clusters) and organic bridge molecules (linkers) as a connecting element between the metal centers. MOFs can in principle be two-dimensional or three-dimensional; MOFs having three-dimensional, porous networks are preferably present in the present invention. MOFs are coordination polymers. The pore size of the MOFs can be varied by the selection of the linker size.

BRIEF SUMMARY OF THE INVENTION

According to the present invention, it is necessary here for the pores to be large enough to trap the molecules which are responsible for the malodor. However, if the MOFs are incorporated into preparations, for example washing or cleaning agents, the pores must not be so large that they trap effective constituents of the corresponding preparation, in the case of washing or cleaning agents, for example surfactants, and thus reduce the effectiveness.

MOFs which have at least two carboxylic acid groups (COOH groups) are particularly preferred. Ligands of the HOOC-A-COOH type are preferred, A being selected from

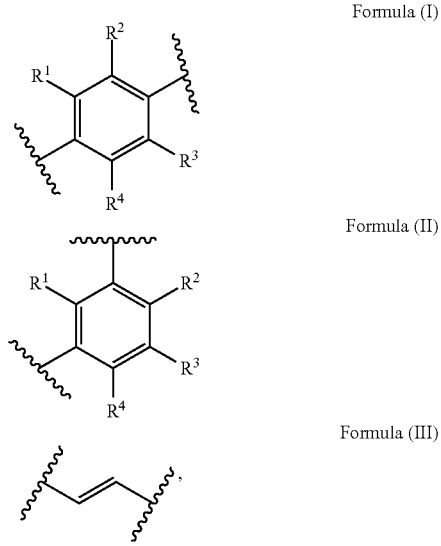

Formula (I)

Formula (II)

Formula (III)

in which $R_1$, $R_2$, $R_3$, and $R_4$ are each, independently of one another, —H, —COOH, —COO—, —OH or —NH$_2$.

The ligand (organic bridge molecule, linker) of the MOF is preferably selected from the following general formula (IV)

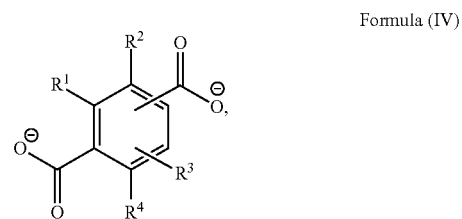

Formula (IV)

where $R^1$, $R^2$, $R^3$ and $R^4$ in the general formula (IV) represent, independently of one another, —H, —COOH, —COO—, —OH or —NH$_2$.

The organic ligand of the MOF is particularly preferably selected from 1,4-benzenedicarboxylic acid (BDC), 1,3,5-benzenetricarboxylic acid (BTC), 2-amino-1,4-benzenedicarboxylic acid (ABDC), fumaric acid, the monovalent, bivalent, or trivalent anions thereof, or mixtures thereof.

According to the invention, an MOF can have several different organic ligands or only one organic ligand.

The MOF preferably comprises aluminum, titanium, zirconium, iron, zinc, bismuth or oxo clusters, hydroxo clusters, hydroxy oxo clusters, or mixtures thereof as a metal component (metal center). The MOF particularly preferably comprises aluminum and/or iron. Surprisingly, it has been shown that metals other than those mentioned often lead to discoloration of textiles if they come into contact with the so-called MOF. It is therefore preferred, in particular when using the MOFs in washing agents which are used for washing textiles, if aluminum and/or iron are used as metal components. It has been shown that copper in particular leads to discoloration of textiles and also to the coloring of rough surfaces, and therefore according to the invention the MOF is preferably free of copper.

An MOF that is particularly suitable for reducing bad odors is MIL-100(Al), in which aluminum is used as the metal center and trimesic acid (1,3,5-benzenetricarboxylic acid) is used as the inorganic ligand. This MOF has so far been obtained in a synthesis that requires high temperatures and pressures. In addition, the previously required use of nitric acid leads to a yellowish discoloration of the product obtained, and toxic methanol is released when the trimesic acid precursor, trimesic acid methyl ester, is converted. Furthermore, due to the drastic reaction conditions, partial decomposition of the nitrate occurs during the reaction, forming harmful nitrous gases. After synthesis, the product has a deep yellow color, presumably due to nitrated by-products, and also contains residues of unreacted trimesic acid that is trapped in the pores of the framework. A complex washing process with N,N-dimethylformamide (DMF) must therefore follow the synthesis, which washing process is followed by a further washing process with water in order to remove the DMF again. Even after this washing process has been repeated several times, however, a yellowish-gray residual coloration of the product obtained in this way remains. Contamination by foreign crystallites is also not completely removed in this way.

There is therefore a need for a synthesis process for producing MIL-100(Al) in which the product is obtained in high purity and with a good yield and has as little discoloration due to contamination as possible. In addition, it is desirable that reaction conditions that are as sustainable as possible exist during the synthesis, under which no harmful substances are released, and that the synthesis can also be transferred to larger scales.

Surprisingly, it has been shown that a production process for MIL-100(Al) in which aluminum nitrate and trimesic acid are brought to react in an alcohol/water mixture as the reaction medium and $NH_3$ and/or an $NH_3$-releasing compound is used as the base for deprotonation of the trimesic acid functions can be carried out at reaction temperatures below 200° C. The MIL-100(Al) obtained in this way under mild reaction conditions and without the formation of harmful gases shows no discoloration due to by-products or foreign phases; the process steps are also scalable.

DETAILED DESCRIPTION OF THE INVENTION

Figure 1:
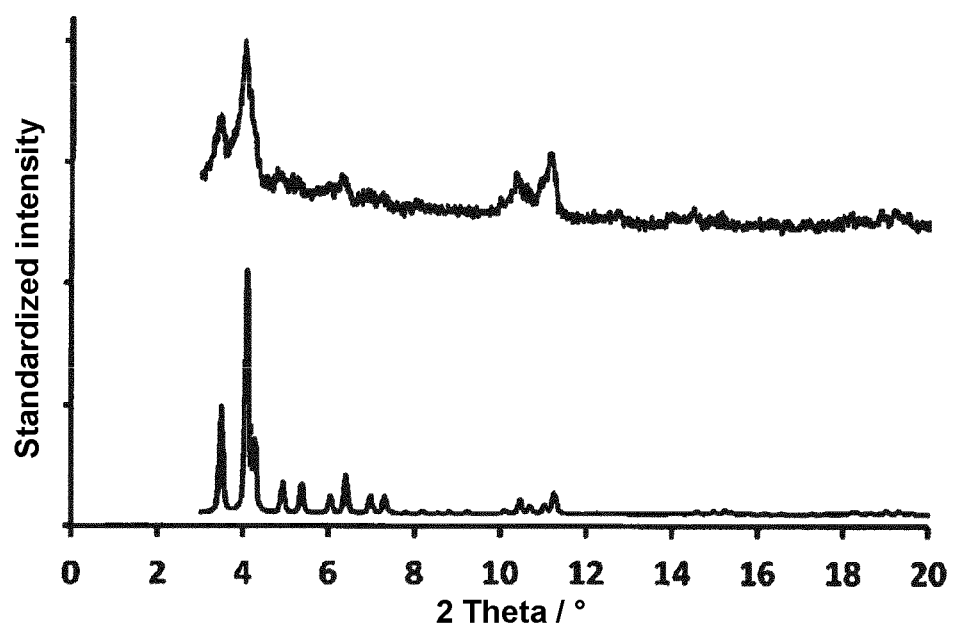
FIG. 1 is an X-Ray powder diffractogram, showing the reflections of MIL-100(Al) at the expected positions.

The present application therefore relates to a process for producing MIL-100(Al) in which aluminum nitrate and trimesic acid are brought to react with one another in an alcohol/water mixture under the action of a base, selected from $NH_3$, an $NH_3$-releasing compound, or mixtures thereof.

Ammonia itself and ammonia-releasing compounds can be used as bases. Among these, the group consisting of urea, urotropine, ammonium carbamate and mixtures thereof is particularly preferred, in particular urea.

An alcohol/water mixture is used as the solvent in this synthesis. Alcohols suitable as solvents are, for example, the $C_{2-6}$ alkylene glycols—optionally etherified at one end with a $C_{1-6}$ alkanol—and poly $C_{2-3}$ alkylene glycol ethers having an average of 1 to 9 identical or different, preferably identical, alkylene glycol groups per molecule, as well as the $C_{1-6}$ alcohols. Monohydric or polyhydric $C_{1-6}$ alcohols are particularly preferred, preferably selected from the group comprising methanol, ethanol, propanol, isopropanol, ethylene glycol, 1,2-propanediol (propylene glycol) 1,3-propanediol, glycerol, and mixtures thereof. It is very particularly preferred if the alcohol is a polyhydric alcohol or a mixture of polyhydric alcohols.

A polyhydric alcohol selected from the group consisting of glycerol, 1,2-propanediol, 1,3-propanediol and mixtures thereof is particularly preferably used, with glycerol and 1,2-propanediol and mixtures thereof being very particularly preferred.

The alcohol and the water are preferably used in a ratio of 98:2 to 20:80, preferably 80:20 to 40:60, vol. % at room temperature.

It is preferred that the reaction be carried out under mild conditions. It is therefore preferred if a reaction temperature below 200° C., preferably below 160° C., is set.

The MOF produced by the process according to the invention can be used in washing or cleaning agents preferably in amounts of from 0.001 to 10 wt. %, preferably from 0.01 to 7 wt. %, in particular from 0.01 to 5 wt. %, preferably from 0.25 to 2.5 wt. %, and more preferably from 0.5 to 1 wt. %. It has been shown that an increase in MOF does not contribute to a reduction in malodors. However, a proportion of 0.001 wt. % is necessary to obtain an effect. Particularly good effects are achieved when MOFs are contained in a proportion of 0.01 wt. % or more and in particular at least 0.25 wt. %. Larger proportions of MOF can achieve a better effect, but also lead to higher costs. With a proportion of 10 wt. %, good odor reduction or prevention can be achieved. A proportion of 1 wt. % also leads to a significant reduction in undesirable odors.

The MOFs produced according to the invention are preferably incorporated as particles into washing or cleaning agents. In this case, the particle size is preferably 0.5 to 100 μm, in particular 5 to 70 μm, particularly preferably 10 to 50 μm. If the MOFs are present as nanoparticles, there is a risk, especially with washing agents, that only a small proportion is deposited on the substrate and thus used, while the majority is washed away unused. If the particle size is greater than 100 μm, the particles are visible to the human eye. The MOFs are deposited on the surface treated with the washing or cleaning agent. Accordingly, they would be visible as contamination on the treated textile surface if they were 100 μm or more in size. The particle size is therefore preferably smaller than 75 μm and in particular smaller than 50 μm.

Washing and cleaning agents can contain the MOF produced according to the invention preferably in an amount of from 0.001 to 10 wt. %, preferably from 0.01 to 7 wt. %, in particular from 0.01 to 5 wt. %, preferably from 0.25 to 2.5 wt. %, and more preferably from 0.5 to 1 wt. %.

It has been shown that a specific surface area which is in the range of from 100 to 4000 m²/g is particularly suitable for retaining malodors without, however, influencing the effectiveness with regard to the cleaning of the washing or cleaning agent according to the invention. The specific surface area is determined using the one-point BET method according to DIN ISO 9277:2014. The specific surface area is preferably from 500 to 3200 m²/g and in particular from 800 to 3000 m²/g.

The washing and cleaning agents in which the MOF can be used include in particular household cleaners, washing, cleaning or pretreatment agents or refreshing sprays for textiles, fabric softeners, cosmetic products or even air care products, for example room sprays or air fresheners. Within the meaning of this application, household cleaners are for example cleaning agents for cleaning hard surfaces, window cleaners, bathroom cleaners, toilet cleaners or dishwashing detergents (hand dishwashing detergents and dishwashing detergents for machine use). Cosmetic products within the meaning of the present application are products for the cosmetic treatment of skin and hair (skin treatment agents, hair treatment agents) such as hair shampoos, hair rinses, hair masques, hair conditioners, agents for bleaching, coloring or shaping the hair, such as dyes, bleaches, tinting agents, color fixing agents, curling agents or styling preparations such as hair setting agents, mousse or styling gels, shower gels, body creams, body lotions, face creams or deodorants.

In refreshing sprays for textiles, the MOF is preferably incorporated in the form of a dispersion; furthermore, at least one dispersing agent and at least one solvent, in particular water, are preferably present. The MOF can then be applied as an aerosol directly to particularly odor-critical regions of textiles, for example the armpit area of outerwear, or of textile parts of furniture, for example seats of sofas or armchairs. This allows the user to dose the MOF in a targeted manner at the desired locations.

If this MOF is used in solid, in particular powdered washing agents, it is preferred if these also contain the following components:
- anionic surfactants, such as preferably alkylbenzene sulfonate or alkyl sulfonate, in particular in a proportion of 5 to 30 wt. %; an anionic surfactant or mixtures of different anionic surfactants can be contained,
- non-ionic surfactants, such as preferably fatty alcohol polyglycol ethers, alkyl polyglucoside or fatty acid glucamide, for example 0.5 to 15 wt. % of one or more non-ionic surfactants,
- one or more builders, for example zeolite, polycarboxylate, sodium citrate, in amounts of in particular from 0 to 70 wt. %, advantageously from 5 to 60 wt. %, preferably from 10 to 55 wt. %, in particular from 15 to 40 wt. %,
- one or more alkaline compounds, for example sodium carbonate, in particular in amounts of from 0 to 35 wt. %, advantageously from 1 to 30 wt. %, preferably from 2 to 25 wt. %, in particular from 5 to 20 wt. %,
- one or more bleaching agents, for example sodium perborate or sodium percarbonate, in amounts in particular of from 0 to 30 wt. %, advantageously from 5 to 25 wt. %, in particular from 10 to 20 wt. %,
- one or more corrosion inhibitors, for example sodium silicate, for example in amounts of from 0 to 10 wt. %, advantageously from 1 to 6 wt. %, preferably from 2 to 5 wt. %, in particular from 3 to 4 wt. %,
- one or more stabilizers, for example phosphonates, advantageously in a proportion of from 0 to 1 wt. %,
- one or more foam inhibitors, for example soap, silicone oils, paraffins, advantageously in a proportion of from 0 to 4 wt. %, preferably from 0.1 to 3 wt. %, in particular from 0.2 to 1 wt. %,
- enzymes, for example proteases, amylases, cellulases, lipases, advantageously in a proportion of from 0 to 2 wt. %, preferably from 0.2 to 1 wt. %, in particular from 0.3 to 0.8 wt. %,
- graying inhibitors, for example carboxymethyl cellulose, advantageously in a proportion of from 0 to 1 wt. %,
- discoloration inhibitors, for example polyvinylpyrrolidone derivates, advantageously in a proportion of from 0 to 2 wt. %, adjusters, for example sodium sulfate, advantageously in a proportion of 0 to 20 wt. %,
- optical brighteners, such as stilbene derivatives, biphenyl derivatives, advantageously in a proportion of from 0 to 0.4 wt. %, in particular from 0.1 to 0.3 wt. %,
- optionally fragrances, such as perfume oils,
- optionally water,
- optionally soap,
- optionally bleach activators,
- optionally cellulose derivatives,
- optionally soil-repellent agents.

The amounts are given in wt. % and refer to the total weight of the washing agent in each case.

The MOFs produced by the process according to the invention can also be used in liquid or gel washing or cleaning agents. Preferred liquid washing or cleaning agents have a water content of in particular from 3 to 95 wt. %, preferably from 8 to 80 wt. % and in particular from 25 to 70 wt. %, based on the total weight of the washing or cleaning agent. In the case of liquid concentrates, the water content can also be lower and may be 30 wt. % or less, preferably 20 wt. % or less, in particular 15 wt. % or less. Here, too, the amounts in wt. % relate to the total weight of the agent in each case. In addition to water, the liquid agents can also contain other non-aqueous solvents. In addition to the MOFs produced according to the invention, a preferred liquid, in particular gel, washing agent can preferably comprise components which are selected from the following:
- anionic surfactants, such as preferably alkylbenzene sulfonate, alkyl sulfonate, in particular in a proportion of 5 to 40 wt. %; an anionic surfactant or mixtures of different anionic surfactants can be contained,
- non-ionic surfactants, such as preferably fatty alcohol polyglycol ethers, alkyl polyglucoside, fatty acid glucamide, preferably in amounts of from 0.5 to 25 wt. % of one or more non-ionic surfactants,
- one or more builders, for example zeolite, polycarboxylate, sodium citrate, advantageously in amounts of from 0 to 15 wt. %, advantageously from 0.01 to 10 wt. %, in particular from 0.1 to 5 wt. %,
- one or more foam inhibitors, for example soap, silicone oils, paraffins, preferably in amounts of from 0 to 10 wt. %, advantageously from 0.1 to 4 wt. %, preferably from 0.2 to 2 wt. %, in particular from 1 to 3 wt. %,
- enzymes, for example proteases, amylases, cellulases, lipases, preferably in amounts of from 0 to 3 wt. %, advantageously from 0.1 to 2 wt. %, preferably from 0.2 to 1 wt. %, in particular from 0.3 to 0.8 wt. %,
- optical brighteners, for example stilbene derivatives, biphenyl derivatives, in particular in amounts of from 0 to 1 wt. %, advantageously from 0.1 to 0.3 wt. %, in particular from 0.1 to 0.4 wt. %,
- optionally fragrances, such as perfume oils,
- optionally stabilizers,
- water, optionally soap, in particular from 0 to 25 wt. %, advantageously from 1 to 20 wt. %, preferably from 2 to 15 wt. %, in particular from 5 to 10 wt. %, optionally non-aqueous solvents, in particular alcohols, advantageously from 0 to 25 wt. %, preferably from 1 to 20 wt. %, in particular from 2 to 15 wt. %.

The amounts in wt. % refer to the total weight of the washing or cleaning agent in each case.

The MOFs can also be incorporated into liquid fabric softeners, which can also preferably contain other components selected from the following:

cationic surfactants, such as in particular esterquats, e.g. in amounts of from 5 to 30 wt. %, co-surfactants, for example glycerol monostearate, stearic acid, fatty alcohols, fatty alcohol ethoxylates, in particular in amounts of from 0 to 5 wt. %, preferably from 0.1 to 4 wt. %, emulsifiers, such as fatty amine ethoxylates, in particular in amounts of from 0 to 4 wt. %, preferably from 0.1 to 3 wt. %, optionally fragrances, such as perfume oils, optionally dyes, preferably in the ppm range, optionally stabilizers, preferably in the ppm range, solvents, such as in particular water, in amounts of preferably from 60 to 90 wt. %.

The amounts in wt. % refer to the total weight of the formulation, i.e. of the softener, in each case. The amount in ppm relates to the weight (wt. % ppm).

In the following embodiments, the present invention is explained by way of example, but without being limiting. Described embodiments can be combined with one another in any manner according to the invention without any limitation.

Embodiments

Example 1: Synthesis of MIL-100(Al) in 68 Vol. % 1,2-Propanediol/Water Mixture at 100° C./48 h on a 10 L Scale 164.8 g (439.3 mmol) Al(NO$_3$)$_3$·9H$_2$O and 22.0 g (366.3 mmol) urea were dissolved in 1 L distilled water. 5.8 L propanediol and 3.2 L water were placed in a stirred tank and preheated to 60° C. with stirring (280 rpm). After adding the aqueous aluminum nitrate/urea solution, 73.8 g (351.2 mmol) solid trimesic acid were added with stirring. The stirred tank was closed and heated to 100° C., stirring was stopped when this temperature was reached and the reaction mixture was kept at 100° C. for 48 hours. The stirred tank was then drained and the contents centrifuged in order to separate the solid from the mother liquor. The crude product was suspended in ethanol, stirred for 30 minutes, centrifuged again and then extracted with ethanol in a Soxhlet apparatus. The solid was then first dried for 8 hours at 80° C. in a circulating air drying chamber and then activated at 150° C. overnight in a vacuum (10$^{-3}$ mbar).

The X-ray powder diffractogram of the sample (FIG. 1) shows the reflections of MIL-100(Al) at the expected positions; apart from MIL-100(Al), no other crystalline phase can be identified (upper graph: synthesis, lower graph: theory).

Figure 2:
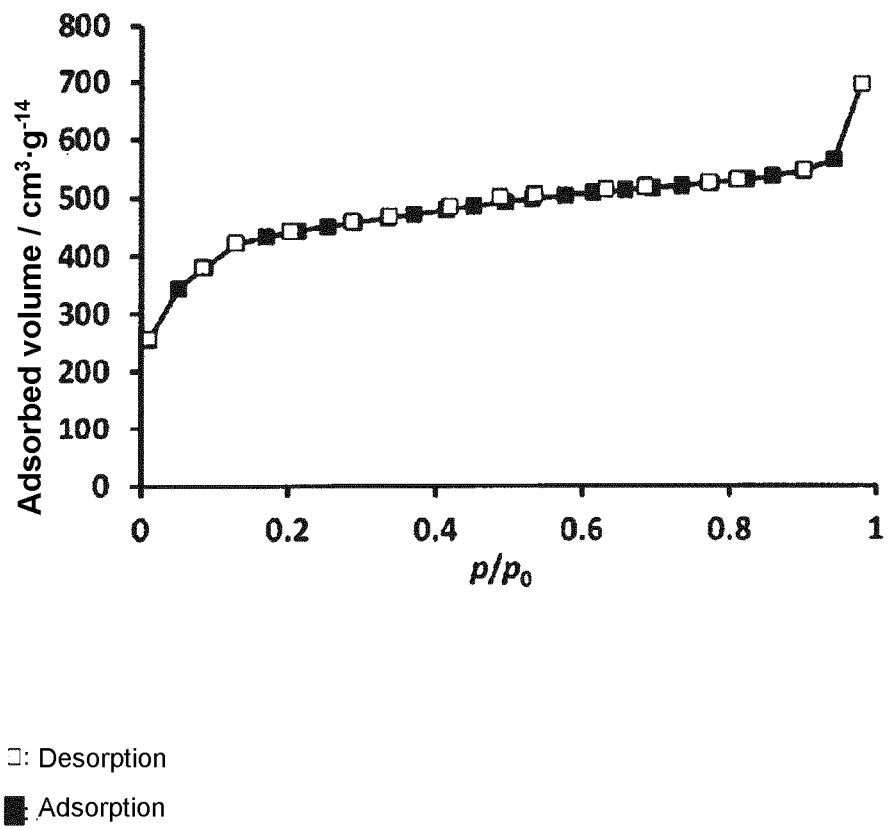
FIG. 2 shows the nitrogen adsorption isotherm recorded at 77K.

From the nitrogen adsorption isotherm recorded at 77K (FIG. 2), a specific surface area of 1420 m$^2$/g was determined at p/p$_0$=0.3 using the one-point BET method. The pore volume determined at p/p$_0$=0.9 is 0.87 cm$^3$/g.

Example 2: Synthesis of MIL-100(Al) in 58 Vol. % Glycerol/Water Mixture at 100° C./48 h on a 10 L Scale 164.8 g (439.3 mmol) Al(NO$_3$)$_3$·9H$_2$O and 22.0 g (366.3 mmol) urea were dissolved in 1 L distilled water. 6.8 L glycerol (86 vol. % solution in water) and 2.2 L water were placed in a stirred tank and preheated to 60° C. with stirring (280 rpm). 73.8 g (351.2 mmol) solid trimesic acid were then added with stirring and after five minutes of stirring the aqueous aluminum nitrate/urea solution was added. The stirred tank was closed and heated to 100° C., stirring was stopped when this temperature was reached and the reaction mixture was kept at 100° C. for 48 hours. The stirred tank was then drained and the contents centrifuged in order to separate the solid from the mother liquor. The crude product was suspended in ethanol, stirred for 30 minutes, centrifuged again and then extracted with ethanol in a Soxhlet apparatus. The solid was then first dried for 8 hours at 80° C. in a circulating air drying chamber and then activated at 150° C. overnight in a vacuum (10$^{-3}$ mbar).

The specific surface area of the product was 1320 m$^2$/g, the pore volume was 0.79 cm$^3$/g.

Example 3: Synthesis of MIL-100(Al) in 68 Vol. % 1,2-propanediol/water Mixture at 100° C./48 h on a 20 L Scale with a Higher Use Concentration of the Raw Materials 494.4 g (1317.9 mmol) Al(NO$_3$)$_3$·9H$_2$O and 66.0 g (1098.9 mmol) urea were dissolved in 2 L distilled water. 11.6 L propanediol and 6.4 L water were placed in a stirred tank and preheated to 65° C. with stirring (280 rpm). After adding the aqueous aluminum nitrate/urea solution, 221.4 g (1053.6 mmol) solid trimesic acid were added with stirring. The stirred tank was closed and heated to 100° C., stirring was stopped when this temperature was reached and the reaction mixture was kept at 100° C. for 48 hours. The stirred tank was then drained and the contents centrifuged in order to separate the solid from the mother liquor. The crude product was suspended in ethanol, stirred for 30 minutes, centrifuged again and then extracted with ethanol in a Soxhlet apparatus. The solid was then first dried for 8 hours at 80° C. in a circulating air drying chamber and then activated at 150° C. overnight in a vacuum (10$^{-3}$ mbar).

Figure 3:
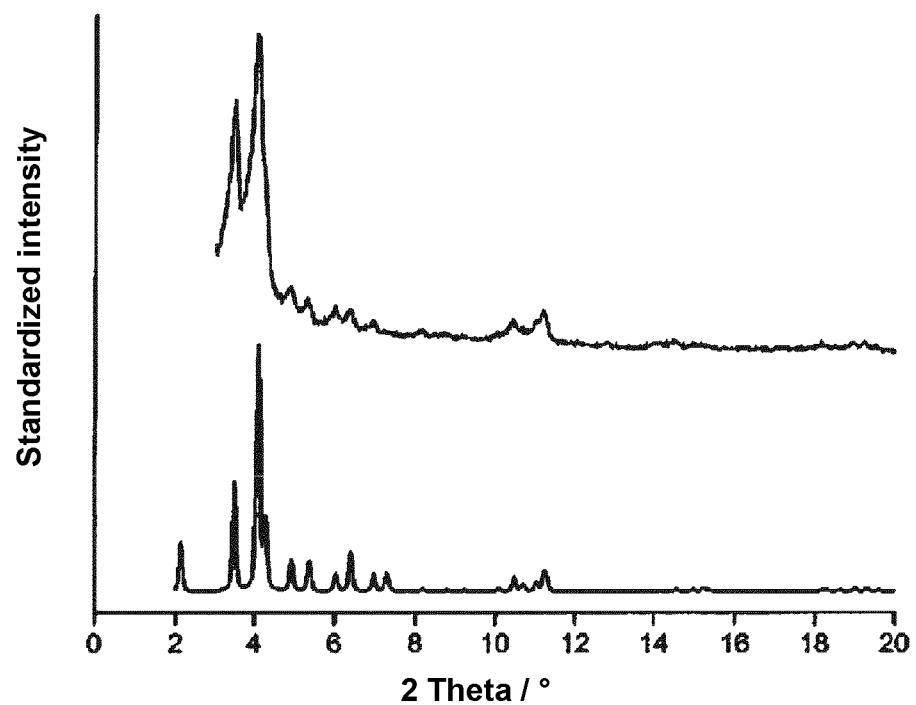
FIG. 3 is an X-Ray powder diffractogram, showing the reflections of MIL-100(Al) at the expected positions.

The X-ray powder diffractogram of the sample (FIG. 3) shows the reflections of MIL-100(Al) at the expected positions; apart from MIL-100(Al), no other crystalline phase can be identified (upper graph: synthesis, lower graph: theory).

Figure 4:
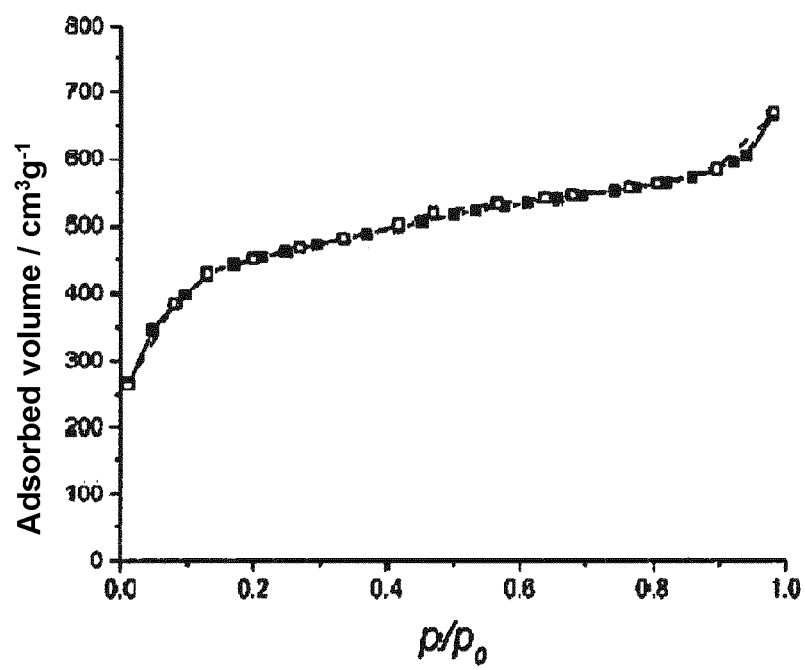
FIG. 4 shows the nitrogen adsorption isotherm recorded at 77K, covering a specific surface area.

From the nitrogen adsorption isotherm recorded at 77K (FIG. 4), a specific surface area of 1448 m$^2$/g was determined at p/p$_0$=0.3 using the one-point BET method. The pore volume determined at p/p$_0$=0.9 is 0.92 cm$^3$/g.

What is claimed is:

1. A process for producing MIL-100(Al), wherein aluminum nitrate and trimesic acid are brought to react with one another in an alcohol/water mixture under the action of a base, wherein the base is selected from the group consisting of NH$_3$, an NH$_3$-releasing compound, and mixtures thereof.

2. The process according to claim 1, wherein the base comprises the NH$_3$-releasing compound and the NH$_3$-releasing compound is selected from the group consisting of urea, urotropine, ammonium carbamate and mixtures thereof.

3. The process according to claim 1, wherein urea is used as the base.

4. The process according to claim 1, wherein the alcohol used is selected from the group consisting of polyhydric alcohols and mixtures of polyhydric alcohols.

5. The process according to claim 1, wherein the alcohol and the water are used in a ratio of 98:2 to 20:80 vol. % at room temperature.

6. The process according to claim 1, wherein the reaction is carried out at a temperature below 200° C.

7. The process according to claim 4, wherein the alcohol used is selected from the group consisting of glycerol, 1,2-propanediol, 1,3-propanediol and mixtures thereof.

8. The process according to claim 5, wherein the alcohol and the water are used in a ratio of 80:20 to 40:60 vol. % at room temperature.

9. The process according to claim 6, wherein the reaction is carried out at a temperature below 160° C.

* * * * *